United States Patent [19]
Brown et al.

[11] Patent Number: 5,532,573
[45] Date of Patent: Jul. 2, 1996

[54] RECONFIGURABLE HYBRID POWER GENERATION SYSTEM

[75] Inventors: Donald W. Brown, Gibsonia; William F. Hannan, III, Monroeville; Dennis Pavlik, Murrysville, all of Pa.

[73] Assignee: Westinghouse Electric Corporation, Pittsburgh, Pa.

[21] Appl. No.: 301,768

[22] Filed: Sep. 7, 1994

[51] Int. Cl.$^6$ ............................... H02P 9/00; H01M 8/10
[52] U.S. Cl. .................................... 322/22; 429/30
[58] Field of Search ............................. 322/22; 429/65.3; 60/39

[56] References Cited

U.S. PATENT DOCUMENTS

| | | | |
|---|---|---|---|
| 5,083,425 | 1/1992 | Hendriks et al. | 60/39.183 |
| 5,359,308 | 10/1994 | Sun et al. | 335/216 |
| 5,413,879 | 5/1995 | Domeracki et al. | 429/30 |
| 5,445,902 | 8/1995 | Soma et al. | 429/30 |
| 5,449,568 | 9/1995 | Micheli et al. | 429/20 |

FOREIGN PATENT DOCUMENTS

| | | | |
|---|---|---|---|
| 0052265 | 5/1982 | European Pat. Off. | H01M 8/04 |
| 4322765 | 6/1994 | Germany | B60L 11/18 |
| 57-143269 | 9/1982 | Japan | H01M 8/04 |
| 4-342961 | 11/1992 | Japan | H01M 8/04 |
| 6-223851 | 8/1994 | Japan | H01M 8/04 |

OTHER PUBLICATIONS

E. H. Myers, *The Unipolar Generator*, pp. 59–61, Mar. 1956, Westinghouse Engineer, vol. 16, No. 2.
J. H. Hirschenhofer, *Fuel Cells A Handbook (Revision 3)*, pp. i–9–14, Jan. 1994, U.S. Department of Energy, publication DOE/METC–94/1006 (DE94004072).

*Primary Examiner*—Steven L. Stephan
*Assistant Examiner*—Nicholas Ponomarenko

[57] ABSTRACT

An apparatus for powering a unipolar motor may include a solid oxide fuel cell having a plurality of sub-modules, a unipolar generator having a plurality of armature turns, and a plurality of jumpers. Each of the sub-modules may produce fuel cell electric power at the fuel cell terminals. Each of the armature turns may produce generator electric power at the generator terminals. The jumpers may interconnect the fuel cell terminals with the generator terminals in order to provide a configurable voltage-current profile for the unipolar motor. The fuel cell may have a fuel cell housing and the generator may have a generator housing. The fuel cell terminals may be located outside of the fuel cell housing and the generator terminals may be located outside of the generator housing. Each of the sub-modules and each of the armature turns may produce a voltage. The jumpers may interconnect the fuel cell terminals in series with the generator terminals in order to sum the voltages for the unipolar motor. Alternatively, the sub-modules may be equal in number to the armature turns and each of the sub-modules may be connected in series with a corresponding one of the armature turns in order to directly provide power to the unipolar motor.

12 Claims, 5 Drawing Sheets

RECONFIGURABLE HYBRID POWER GENERATION SYSTEM

CROSS REFERENCE TO RELATED APPLICATIONS

The inventions taught herein are related to two concurrently filed, copending applications including application Ser. No. 08/301,806 entitled "FUEL CELL POWERED PROPULSION SYSTEM" by William R. Wolfe et al. (Attorney Docket No. 58,441), and application Ser. No. 08/301,767 entitled "BOOST GENERATOR FOR HYBRID FUEL CELL/TURBINE-GENERATOR SYSTEM" by Donald W. Brown et al. (Attorney Docket No. 58,458).

BACKGROUND OF THE INVENTION

1. Field of the Invention

This invention relates to an apparatus including a fuel cell and a generator for powering a load, and in particular, to such an apparatus which provides a reconfigurable direct current voltage-current profile for a unipolar or homopolar motor from selected solid oxide fuel cell sub-modules and from selected generator armature turns.

2. Background of Information

Mechanical propulsion systems for mobile machines have evolved over the past two centuries. For example, early steamboats were direct replacements for rowboats and sailboats. Other initial propulsion systems upgraded or replaced previous animal propulsion systems. Early steam railway engines, for example, were essentially replacements for horsepower. Today, in developed nations, draft animals are primarily merely historical curiosities.

Automotive engines, for example, typically evolved from stationary engine types as stationary engine technology grew in capabilities and offered improved performance parameters. Improvements in fuel efficiency, powerplant specific weight and space, fixed and operating costs, reliable operation, and ease of operation have been the most important motivating factors in automotive power applications. The predominance of steam, electric, gasoline, diesel, and gas turbine engines has waxed and waned depending on the fixed cost of the engine, the variable operating cost of the fuel, the amount of pollution caused by the fuel (i.e., the environmental cost), and the ability of the various engine manufacturers to compete in the marketplace. This economics-driven turbulence continues to govern the engine industries today.

It is well-known to use a battery to power an electric motor which propels a vehicle. In a land vehicle, for example, a power electronic controller is typically used to control a traction motor in response to a driver's demand. However, such controller includes fixed losses in the primary power control loop and, hence, there is room for reduction of the resulting power losses.

The major difference between conventional electric vehicles and conventional internal combustion vehicles is the energy storage mechanism (i.e., a battery in place of a liquid fuel such as gasoline) and the engine (i.e., an electric motor including a power electronic controller in place of an internal combustion engine). From an environmental standpoint, the use of batteries, which provide "zero emissions", is preferred over liquid fuels, which typically generate hydrocarbon and other pollutants. Nevertheless, batteries merely move the source of the pollution from the vehicle to an electric utility which produces the electricity to recharge the batteries.

Although internal combustion engines generate pollutants and are inefficient, energy can be conveniently stored in reasonable quantities in the vehicle and is readily available on demand. Furthermore, such vehicle can be conveniently and quickly refueled. On the other hand, batteries are inherently limited in terms of both operating range and recharge rate. For example, the energy density (i.e., energy per unit weight or volume) of conventional lead-acid batteries is about 40 WH/Kg compared to the energy density of gasoline of about 12,000 WH/Kg.

Fuel cells are also well-known in the art. Examples of fuel cells are discussed in J. H. Hirschenhofer et al., Fuel Cells A Handbook (Revision 3), dated January 1994, U.S. Department of Energy, publication DOE/METC-94/1006 (DE94004072), which is incorporated herein by reference. Fuel cells are energy conversion devices which produce heat and direct current (DC) electricity from a chemical fuel and an oxidizer through a continuous electrochemical reaction.

Technological combinations of simpler engine types have been provided in order to achieve the advantages and, also, avoid the disadvantages of such engine types. In this light, turbo-charged diesel engines successfully retain the efficiency of naturally-aspirated diesels while overcoming some of their weight penalties. Other compound engines have also been built, including hybrid electric/combustion configurations.

It is further known to provide a hybrid vehicle which utilizes a high energy density device (e.g., a liquid fuel or a fuel cell) in conjunction with a high power density (i.e., power per unit weight or volume) device (e.g., a battery and/or a flywheel). The high energy density device provides an average or baseline power. In contrast, the high power density device furnishes peak power for acceleration and/or climbing hills. The efficiency gains result from improved operating points which reduce both fuel consumption and total exhaust emissions. In maritime vehicles, for example, there is no strict requirement for rapid acceleration and, thus, the power density requirement is less demanding. On the other hand, in land vehicles, where rapid acceleration and hill climbing are needed, a relatively high power density is required.

It is generally well recognized that a satisfactory solution to the energy storage functional requirement is the major technological barrier to a practical electrical vehicle. Efficient, economical, lightweight electric motors and compatible drive systems are evolving to meet specific drive application needs. While a DC motor used to be the primary solution, alternating current (AC) motors appear to be the motor of choice at the present time. This is because the AC motor is both simpler (lower cost) and is capable of much higher rotational speeds than the (conventional or traditional) DC motor, even though the required AC motor control is much more complex (e.g., a simple chopper is all that is typically required for the DC motor).

When both the control system and the machine are considered, some experts believe that there is little fundamental difference in the AC or (conventional) DC drives. The (traditional) DC machine is an almost ideal traction motor, but is expensive. Also, due to the speed limitations of the (traditional) DC machine, it must be larger than an AC machine for an equivalent power requirement. Using sophisticated, complex power electronics, the low cost AC machine can be made to behave like a DC traction machine.

There is a need, therefore, for an improved electric vehicle.

More particularly, there is a need for such a vehicle that utilizes common fuels.

There is another more particular need for such a vehicle that has an improved operating range.

There is still another more particular need for such a vehicle that has an improved capability for acceleration.

There is yet another more particular need for such a vehicle that significantly reduces net total pollution.

There is a further more particular need for such a vehicle that reduces fixed and operating costs.

SUMMARY OF THE INVENTION

These and other needs are satisfied by the invention which is directed to an apparatus for powering a load. The apparatus may include a fuel cell having a plurality of sub-modules, a generator having a plurality of armature turns, and a plurality of connection mechanisms. Each of the sub-modules may produce fuel cell electric power at a plurality of fuel cell terminals. Each of the armature turns may produce generator electric power at a plurality of generator terminals. The plurality of connection mechanisms may interconnect the fuel cell terminals with the generator terminals in order to provide a configurable voltage-current (V-I) profile for the load. The fuel cell terminals may be located outside of a fuel cell housing and the generator terminals may be located outside of a generator housing.

Each of the sub-modules and each of the armature turns may produce a voltage. The connection mechanisms may interconnect the fuel cell terminals in series with the generator terminals in order to sum the voltages for the load. Alternatively, the sub-modules may be equal in number to the armature turns, and each one of the sub-modules may be connected in series with a corresponding one of the armature turns in order to directly provide power to the load.

Alternatively, an apparatus for powering a load may include a fuel cell having a plurality of sub-modules, a turbine-generator, and a controller. The fuel cell may also include a fuel input, an oxidizer input, and a thermal exhaust output. Each of the sub-modules may produce fuel cell electric power at a plurality of fuel cell terminals. The turbine-generator may include a turbine for driving a generator which has a plurality of armature turns. The turbine may have a thermal exhaust input interconnected with the thermal exhaust output of the fuel cell. The armature turns may produce generator electric power at a plurality of generator terminals. The connection mechanisms may interconnect the fuel cell terminals with the generator terminals in order to provide a configurable V-I profile for the load. The controller may control at least one of the fuel input and the oxidizer input of the fuel cell.

Each of the sub-modules may have a fuel cell V-I profile and each of the armature turns may have a generator V-I profile. The fuel cell V-I profile may have a fuel cell current and a fuel cell voltage which generally decreases with increases in the fuel cell current. The generator V-I profile may have a generator current and a generator voltage which generally increases with increases in the generator current. The sub-modules and the armature turns may produce a series output voltage. The configurable V-I profile for the load may have a load current and the series output voltage. The series output voltage may be generally constant with respect to changes in the load current. Alternatively, the output voltage may generally increase with increases in the load current.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENT

Figure 1:
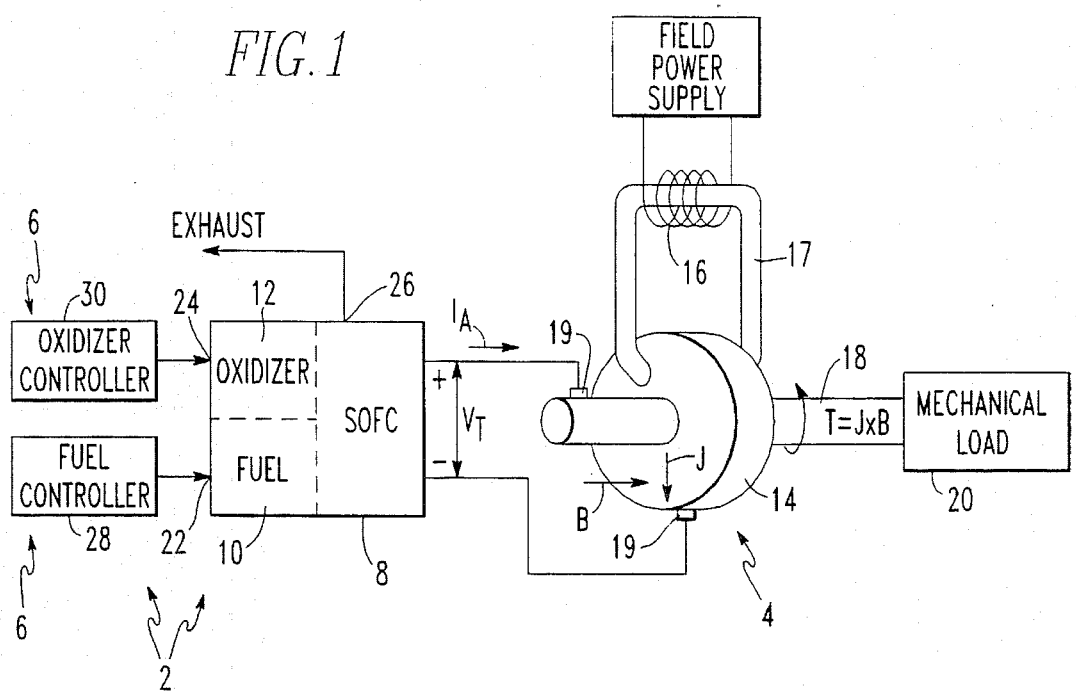
FIG. 1 is a block diagram of a fuel cell power supply for an electric motor in accordance with an embodiment of the present invention.

Referring to FIG. 1, a block diagram of a fuel cell power supply 2 and an electric motor 4 is illustrated. The fuel cell power supply 2 provides direct current (DC) electric power directly to the electric motor 4. The fuel cell power supply 2 includes a control mechanism 6 and an exemplary solid oxide fuel cell (SOFC) 8, it being understood that the present invention is applicable to any type of fuel cell. The SOFC 8 provides a continuous electrochemical reaction of a fuel 10 and an oxidizer 12 to produce DC electricity (i.e., a DC voltage $V_T$ and a DC current $I_A$).

The exemplary DC unipolar electric motor 4 has DC and low voltage characteristics which match the DC output $V_T, I_A$ of the SOFC 8. The unipolar (or homopolar) motor 4 is an inherently simple, low voltage, high current machine. Examples of unipolar devices are discussed in E. H. Myers, *The Unipolar Generator*, dated March 1956, Westinghouse Engineer, Volume Sixteen, Number Two, which is incorporated herein by reference. The unipolar motor 4 includes an armature or rotating disc 14, a field coil 16, a stator 17, a rotating shaft 18, and two brushes 19. The unipolar motor 4 produces torque (T) from the interaction of the DC electric current (J =IA) in the armature 14 and the excitation magnetic field (B) in the field coil 16.

The SOFC 8 is connected directly to the unipolar motor 4 and functions as a demand controlled variable power source. The fuel cell power supply 2 provides direct energy conversion of the fuel 10 and the oxidizer 12 to DC electricity ($V_T, I_A$), direct coupling of the DC electricity to the armature 14 of the unipolar motor 4, and direct drive from the shaft 18 of the unipolar motor 4 to the mechanical load 20. The SOFC 8 has a fuel input 22, an oxidizer input 24, and an exhaust output 26.

The fuel cell power supply 2 also includes a fuel controller 28 for controlling the fuel input 22 and an oxidizer controller 30 for controlling the oxidizer input 24 of the SOFC 8. Hence, the control of the unipolar motor 4 is achieved by controlling the fuel input 22 and the oxidizer input 24 of the SOFC 8. Alternatively, as discussed in greater detail below with FIG. 2, the control of the unipolar motor 4 is also achieved by controlling the excitation magnetic field (B) in the field coil 16. Those skilled in the art will appreciate that further control is possible by controlling transmission ratios (not shown) in the mechanical load 20.

The SOFC 8 provides a relatively high energy conversion efficiency which is typical of an electrochemical reaction. Such efficiency exceeds the Carnot efficiency of conventional heat engines (e.g., the internal combustion engine). The exemplary SOFC 8 uses common oxidizers 12 (e.g., air or oxygen). The exemplary fuel 10 is a sulfur free fuel gas which is an arbitrary mixture of hydrogen ($H_2$) and carbon monoxide (CO). Alternatively, hydrogen or carbon monoxide may be exclusively utilized. This fuel gas may be produced from common logistic hydrocarbon (i.e., compounds which contain hydrogen and carbon) fuels (e.g., natural gas and/or vaporized liquid fuels such as diesel fuel, methanol or ethanol) using both existing and developing reformer technologies. The exhaust output 26 of the SOFC 8 is environmentally benign.

Figure 2:
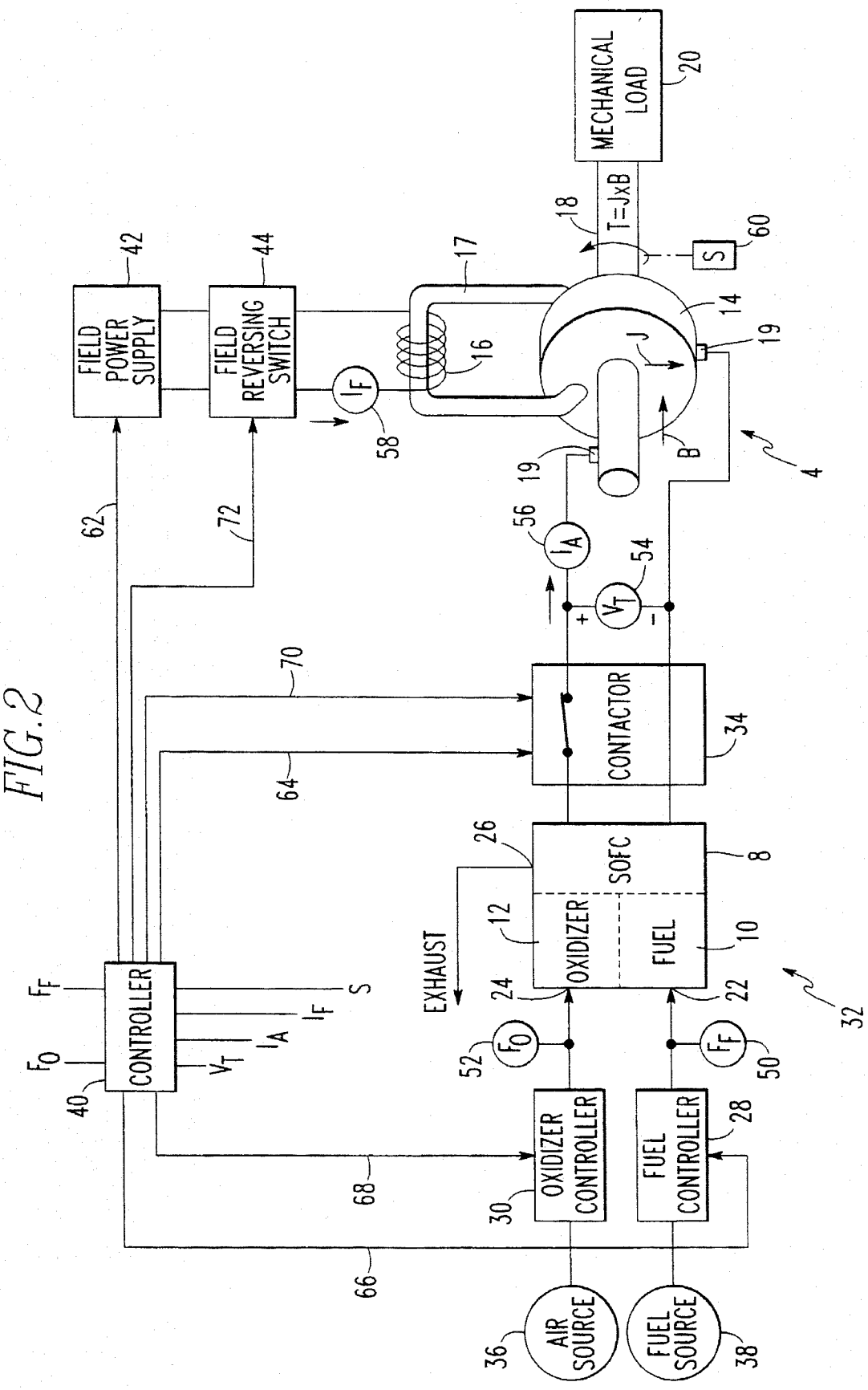
FIG. 2 is a block diagram of another fuel cell power supply for an electric motor in accordance with an alternative embodiment of the present invention.

Referring now to FIG. 2, a block diagram of a fuel cell power supply 32 is illustrated. Except as noted below, the fuel cell power supply 32 is similar to the fuel cell power supply 2 of FIG. 1. The exemplary SOFC 8 is connected directly to the exemplary unipolar motor 4 by a high current DC contactor 34. A non-limiting example of the contactor 34 is a Type 703 5000 Amp 1000 Volt DC Contactor manufactured by Siemens Electric Limited. Those skilled in the art will appreciate that the exemplary contactor 34 is not required and may be eliminated, or may be replaced or supplemented by a fuse or a wide variety of electromagnetic switching devices, such as a circuit breaker; a vacuum, air gap or insulating gas contactor; or a motor starter.

The fuel cell power supply 32 also includes an air source 36, which supplies air to the oxidizer controller 30, and a fuel source 38, which supplies fuel to the fuel controller 28, it being understood that the exemplary SOFC 8 may use a variety of common fuels 10 and common oxidizers 12. The fuel cell power supply 32 further includes a controller 40 for controlling the fuel controller 28, the oxidizer controller 30, a field power supply 42, and a field reversing switch 44. Hence, the control of the unipolar motor 4 is generally achieved by controlling the fuel input 22, the oxidizer input 24, and the excitation magnetic field (B) of the unipolar motor 4. The excitation magnetic field (B) is determined by the excitation field current ($I_F$). This excitation field current ($I_F$) is controlled through the field power supply 42 and the field reversing switch 44. Those skilled in the art will appreciate that further control is possible by controlling transmission ratios (not shown) in the mechanical load 20.

The exemplary controller 40 utilizes six sensors 50,52, 54,56,58,60 which measure fuel flow ($F_F$), oxidizer flow ($F_O$), motor terminal voltage (VT), armature current ($I_A$), excitation field current ($I_F$), and motor speed (S), respectively, in order to control the exemplary unipolar motor 4.

The controller 40 energizes the unipolar motor 4 by controlling the field power supply 42 using control line 62, adjusting the excitation field current ($I_F$) as monitored by the field current sensor 58 and, thus, adjusting the excitation magnetic field (B); closing the contactor 34 using control line 64; and controlling the fuel flow ($F_F$) and the oxidizer flow ($F_O$) to the appropriate level using control lines 66,68, respectively, for a selected motor speed (S) of the unipolar motor 4. The motor speed (S), as monitored by the speed sensor or tachometer 60, may be increased by, for example, increasing the fuel flow ($F_F$) to the SOFC 8. The unipolar motor 4 may be stopped, for example, by reducing the fuel flow ($F_F$) to a minimum level and, then, adding armature circuit resistance (e.g., using the variable series resistor 120 of FIF. 4) and/or switching the contactor 34 open.

The unipolar motor 4 may generally be operated in the reverse direction by reversing the excitation magnetic field (B). In particular, the controller 40 opens the contactor 34 using control line 70; reduces the excitation field current ($I_F$) to zero, as monitored by the field current sensor 58, by adjusting the field power supply 42 using the control line 62 and, hence, disabling the excitation magnetic field (B); reverses the excitation field polarity by controlling the field reversing switch 44 using control line 72; increases the excitation field current ($I_F$), as monitored by the field current sensor 58, by adjusting the field power supply 42 using the control line 62 and, hence, re-enabling the excitation magnetic field (B); closes the contactor 34 using the control line 64; and controls the fuel flow ($F_F$) and the oxidizer flow ($F_O$) to the appropriate level using the control lines 66,68, respectively, for a selected reverse motor speed (S).

The exemplary fuel cell power supplies 2,32 of FIGS. 1,2, respectively, maximize the direct use of DC electric power, thereby minimizing electrical and mechanical power conversions. The unipolar motor 4 and the SOFC 8 are both low voltage, high current devices. Hence, even a relatively small voltage loss provides a significant power loss. By connecting the unipolar motor 4 directly to the SOFC 8, conventional intervening power electronic controllers, and their associated power losses and cost, are eliminated. Furthermore, by using fewer components, power losses and component costs are reduced. Therefore, low system complexity and high system efficiency provide an optimal power or propulsion system in terms of both fixed and operating costs. Moreover, the reduced mechanical noise from moving parts and the DC power transfer provide a low signature which is critical, for example, in military applications. When applied as a propulsion system for an electric vehicle, for example, the exemplary fuel cell power supplies 2,32 are 2–3 times as efficient (see FIG. 3 below) as conventional internal combustion vehicles and feature the lowest emission characteristics of all practical systems.

Figure 3:
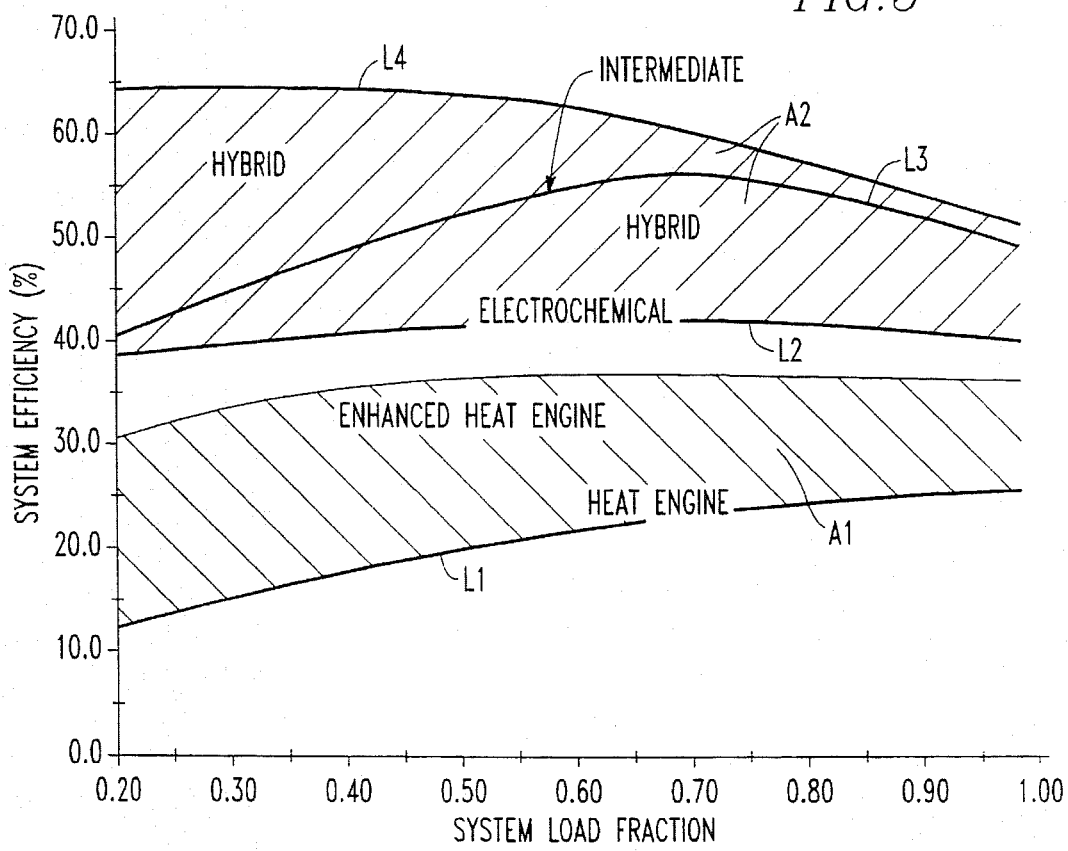
FIG. 3 is a graph of system efficiency versus system load fraction in accordance with the present invention.

FIG. 3 is a graph of system efficiency versus system load fraction for various types of energy conversion systems. The "heat engine" line L1 is at the bottom of the graph and represents conventional internal combustion engines (primarily gasoline engines) and turbines. The area directly above the heat engine line L1 is the "enhanced heat engine" area A1 which represents the combination of heat engine prime energy conversion and various energy recovery techniques including other heat engines and heat exchangers. The conventional turbo-charged diesel engine represents the most commonly used enhanced heat engine system for transportation.

The "electrochemical" line L2 represents fuel cells (e.g., the SOFC 8 of FIGS. 1–2). The area directly above the electrochemical line L2, the "hybrid" area A2, represents the combination of the electrochemical prime energy conversion and various energy recovery techniques including heat engines and heat exchangers.

The heat engine line L1 and the enhanced heat engine area A1 represent the predominant systems for conventional transportation applications. The heat engine line L1 represents the simplest and most commonly used system in which fixed component cost is the predominant selection criteria. The enhanced heat engine area A 1 is more difficult to justify for transportation, unless fuel efficiency is a significant factor, because the energy recovery hardware is not as effective as the prime energy conversion hardware.

Electrochemical systems may possess higher efficiency than heat engines and enhanced heat engine systems. However, the basic fuel cell systems typically have a relatively low power density and are difficult to justify for transportation, especially when common logistic fuels are taken into account. An energy crisis or a breakthrough in fuel cell power density may change this justification status. Furthermore, future pollution control requirements may also provide a significant change to such status.

The upper boundary line LA of the hybrid area A2 defines a system, configured much like a stationary utility application, where efficiency is paramount. However, significant increases in system power density are possible at the expense of some efficiency. For example, the "intermediate" line L3 represents a hybrid system suitable for transportation. Exemplary "intermediate" systems, which integrate a turbine-generator with a fuel cell, are described below with FIGS. 4 and 5. In summary, hybrid power generation provides system efficiencies which far exceed heat engine systems and which are much greater than fuel cells alone. Moreover, because fuel cell emission levels are well below the levels of competing systems, which include pollution control technologies, significant fuel savings and reduced $CO_2$ emissions result.

Figure 4:
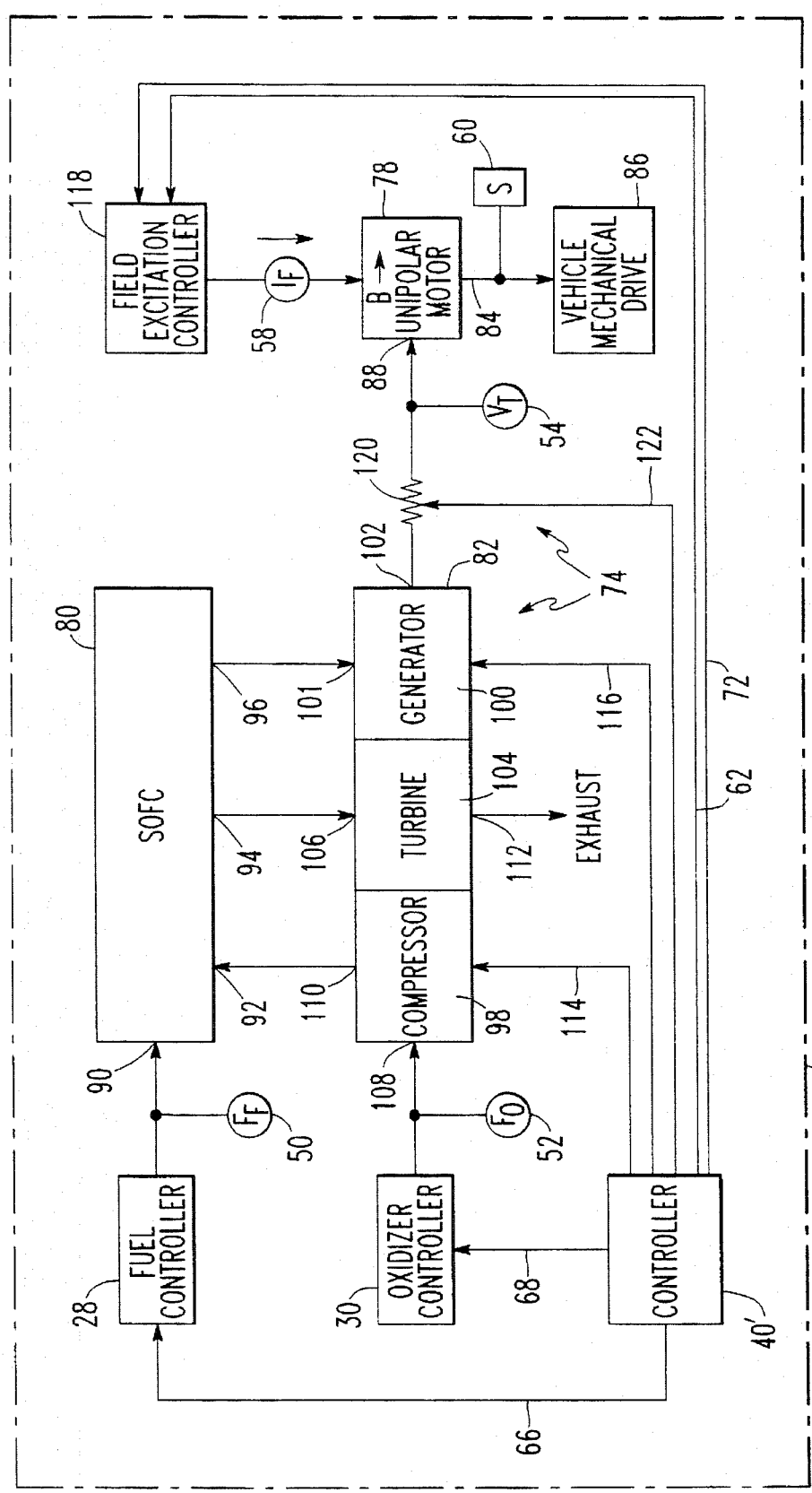
FIG. 4 is a block diagram of a fuel cell, a turbine-generator and an electric motor in accordance with another embodiment of the present invention.

FIG. 4 is a block diagram of a power train 74 for a vehicle 76, it being understood that the present invention is applicable to any vehicle (e.g., a maritime vehicle, a land vehicle, etc. ). The exemplary power train 74 includes an electric motor 78, a fuel cell 80, and a turbine-generator 82. The exemplary DC unipolar electric motor 78 has a motor shaft 84, which powers the vehicle mechanical drive 86, and a motor electric power input 88, which conducts a DC electric current. The exemplary SOFC fuel cell 80 includes a fuel input 90, a fuel cell oxidizer input 92, a thermal exhaust output 94, and a fuel cell electric power output 96. The exemplary fuel and oxidizer inputs 90,92 are similar to the fuel and oxidizer inputs 22,24, respectively, of FIGS. 1 and 2. The SOFC 80 provides fuel cell thermal power using the thermal exhaust output 94 and fuel cell DC electrical power using the fuel cell electric power output 96. Preferably, in terms of cost, size and weight, the exemplary power train 74 utilizes compressed air for the oxidizer input 92.

The exemplary SOFC 80 provides an electrochemical reaction of fuel and compressed air to produce heat and DC power, it being understood that the present invention is applicable to any type of high temperature fuel cell. The high temperature exhaust gas at the thermal exhaust output 94 provides high quality heat (e.g., 900° C. for the exemplary SOFC 80) which is useful for energy recovery by the turbine-generator 82.

The exemplary turbine-generator 82, which provides turbine-generator electric power, includes a compressor 98 for pressurizing oxidizer, a boost DC unipolar electric generator 100, and a turbine 104 for driving the compressor 98 and the DC generator 100. The DC generator 100 has a generator input 101, which receives the fuel cell electric power output 96, and a generator electric power output 102, which produces generator DC electrical power. The turbine 104 has a thermal exhaust input 106 which is interconnected with the thermal exhaust output 94 of the SOFC 80. The compressor 98 has a compressor oxidizer input 108, which is interconnected with the oxidizer controller 30, and an oxidizer output 110, which is interconnected with the fuel cell oxidizer input 92. The exemplary compressor 98 pressurizes the SOFC 80 with compressed air. This increases the net efficiency of the SOFC 80 by enhancing the energy recovery from the thermal exhaust output 94 and, also, by increasing the voltage of the fuel cell electric power output 96.

As discussed in greater detail below with FIGS. 5, 6 and 7A-7B, the DC generator 100 is generally electrically connected in series with the fuel cell electric power output 96. The generator electric power output 102, thus, supplements the fuel cell electric power output 96, which is received by the generator input 101, in order to produce DC electric power for the motor electric power input 88 of the unipolar motor 78. The fuel cell electric power output 96 has a fuel cell output voltage. The generator electric power output 102 has a generator output voltage. In the exemplary embodiment, the DC generator 100 provides a power boosting voltage, which boosts the voltage of the fuel cell electric power output 96, and produces the generator electric power output 102. The generator output voltage is added to the fuel cell output voltage of the fuel cell electric power output 96 in order to produce electric power for the motor electric power input 88 of the unipolar motor 78.

The exemplary turbo-charged SOFC power train 74 combines the SOFC 80 with compression/expansion engine components of the exemplary turbine-generator 82 in order to achieve high thermal efficiency at a reasonable cost. Essentially, the power train 74 is provided with added flexibility due to the integrated rotating electrical machinery. The integration of the SOFC 80, the turbine 104, the compressor 98, and the DC generator 100 provides high efficiency power generation with controllable DC output current in order to enable direct coupling to a wide range of loads such as the exemplary unipolar motor 78. The exemplary turbine 104 utilizes a turbine exhaust output 112 to output exhaust gas. The temperature of this exhaust gas is comparable to the temperature of the exhaust from a conventional internal combustion engine (not shown). Large systems (e.g., large maritime platforms) use this exhaust gas to produce steam or hot water. Other systems (e.g., automotive platforms) mix this exhaust with air in order to reduce the exhaust temperature before final discharge.

The power train 74 further includes a controller 40', which is similar to the controller 40 of FIG. 2. The exemplary controller 40' controls the fuel controller 28 using the control line 66 and the oxidizer controller 30 using the control line 68. The controller 40' further includes a control line 114, which controls the oxidizer output 110 of the compressor 98, and a control line 116, which regulates the generator field current in order to control the boost voltage contribution of the series connected DC generator 100 to the fuel cell electric power output 96. As discussed in greater detail below, a significant portion of this control is achieved by controlling this boost voltage contribution. Furthermore, in a manner similar to FIG. 2, the controller 40' uses the control lines 62 and 72, which are connected to a field excitation controller 118, to control the field power and excitation field polarity, respectively, for the unipolar motor 78. In this manner, the excitation magnetic field (B) and the excitation field current ($I_F$) of the unipolar motor 78 are also controlled.

The exemplary controller 40' uses two control modes which accommodate the different voltage characteristics of the generator electric power output 102 and the unipolar motor 78, it being understood that other specific control strategies are possible. The voltage of the fuel cell electric power output 96 decreases with increasing load (see, for example, profile A' of FIG. 6). In contrast, the voltage required by the unipolar motor 78 is linear with speed and, therefore, increases with load. A first "voltage" control mode is utilized for 0–10% load or 0–46% of rated speed. A second "field weakening" control mode is utilized for >10% load or >46% of rated speed.

A variable series resistor 120 is connected between the generator electric power output 102 and the motor electric power input 88. The controller 40' controls the resistance of the variable resistor 120 by a control line 122. In the voltage control mode, the motor terminal voltage (VT) is controlled linearly with speed. The resistance of resistor 120 is varied in order that the series combination of the resistor 120 and the unipolar motor 78 follows the voltage profile of the generator electric power output 102 (see, for example, profile C of FIG. 6) which, in the voltage control mode, is primarily controlled by the SOFC 80. At the 0% load point, the resistance of the variable resistor 120 is maximum. At the 10% load point and above, the variable resistor 120 is completely shorted (i.e., 0Ω) and the unipolar motor 78 operates at the voltage of the generator electric power output 102. Within the 0–10% load range, the motor terminal voltage (VT) varies linearly with speed. Those skilled in the art will appreciate that the variable resistor 120 may further be used for starting or braking the vehicle 76.

In the field weakening control mode, the excitation magnetic field (B) of the unipolar motor 78 is determined by the excitation field current ($I_F$). This excitation magnetic field (B) is reduced from a maximum "low load" value (at 0–10% load or 0–46% of rated speed) in order to control the motor speed (S) while operating at the positively-sloped voltage of the generator electric power output 102. Preferably, the unipolar motor 78 provides an excitation field current ($I_F$) of approximately 2.0 perunit for operation at the maximum low load value.

The controller 40' includes three nested proportional-integral-derivative (PID) control loops. Because the time constraints for the SOFC 80 are much longer than those for the DC unipolar generator 100 and the unipolar motor 78, a primary PID control loop controls the SOFC 80. The primary PID control loop converts a speed setpoint into a power requirement for the SOFC 80. The primary PID control loop also determines a speed error signal which is the difference between the speed setpoint and the motor speed (S) sensed by the tachometer 60. Then, the controller 40', utilizing the control lines 66 and 68, sets the respective fuel flow (FF) and the oxidizer flow ($F_O$) based on the speed error signal and a predetermined current capability for the SOFC 80.

The second PID control loop controls the motor speed (S) using the voltage control mode (by controlling the motor terminal voltage ($V_T$)) and the field weakening control mode by controlling the excitation magnetic field (B)). The third PID control loop controls the DC generator 100, which is connected in series with the SOFC 80, in order to provide a generally constant motor terminal voltage ($V_T$) over the entire 0–100% load range (see, for example, profile C of FIG. 6 which provides a slightly positive slope).

Figure 5:
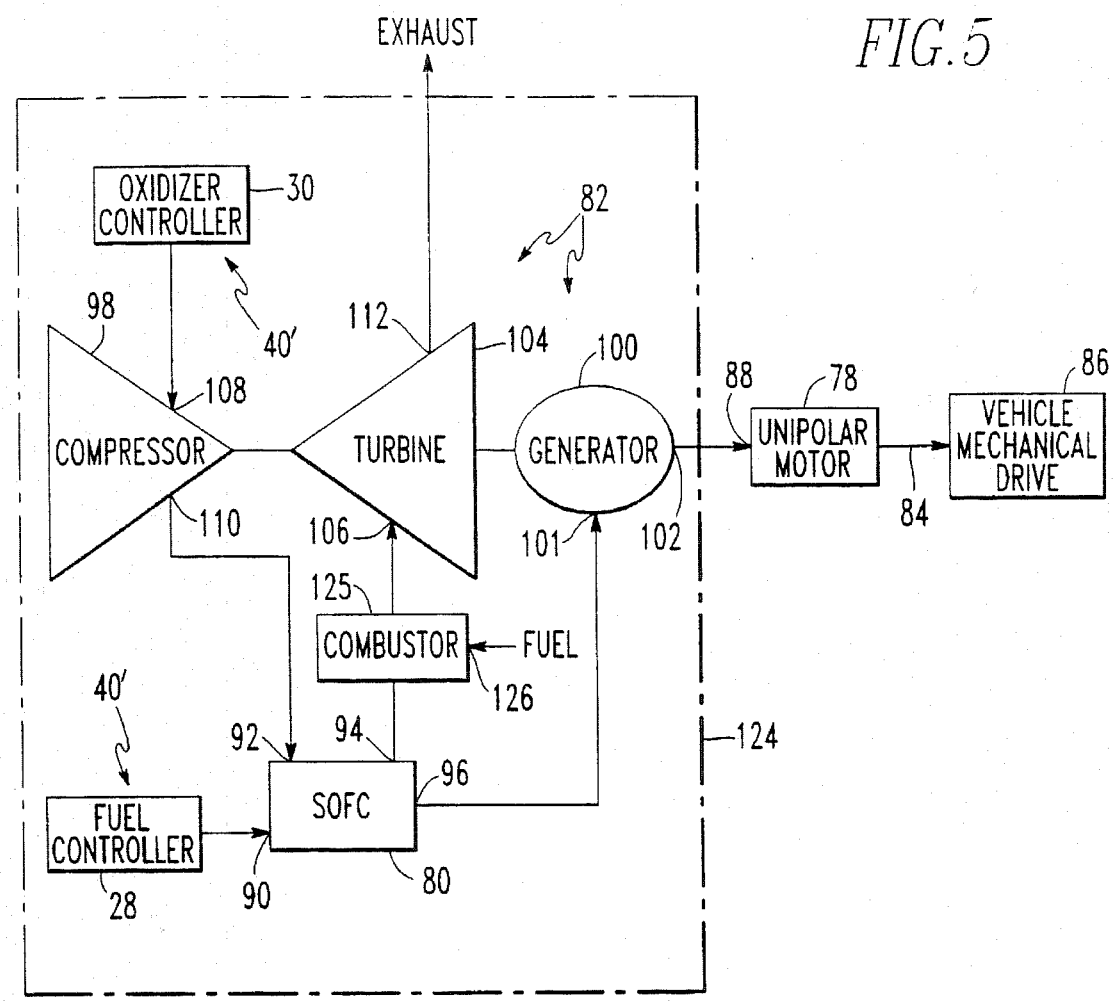
FIG. 5 is a schematic diagram of the fuel cell and the turbine-generator of FIG. 4 which form a power generator in accordance with the present invention.
Figure 6:
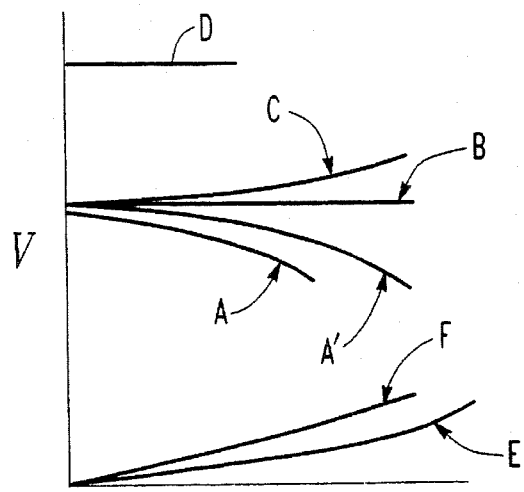
FIG. 6 is a graph of various voltage-current profiles in accordance with the present invention.

The integrated SOFC 80 and boost DC generator 100 enable energy recovery and control within a power generation module 124 as illustrated in the schematic diagram of FIG. 5. This significantly reduces the need for additional external power conditioning equipment. The corresponding voltage-current (V-I) profiles are shown in FIG. 6. The exemplary SOFC 80 and turbine-generator 82 complement each other to produce a desirable power output for the motor electric power input 88 of the unipolar motor 78. At peak power output, the SOFC 80 voltage and efficiency are lowest. At this operating point, the peak energy is available in the thermal exhaust output 94 of the SOFC 80 and, hence, the potential voltage boost from the turbine-generator 82 is the largest. As the power output drops, the turbine 104 becomes less effective, and the output voltage from the power generation module 124 at the power output 102 approaches that of the SOFC 80.

As shown in FIG. 5, start-up and additional control flexibility of the exemplary power generation module 124 is accomplished by a combustor 125 having a fuel input 126. The combustor 125 is interconnected between the thermal exhaust output 94 of the SOFC 80 and the thermal exhaust input 106 of the turbine 104. The exemplary combustor 125 is used to bring the SOFC 80 to a minimum operating temperature (e.g., approximately 600° C.), above which the SOFC 80 supplies heat to the turbine 104. The combustor 125, also, completes the reaction of partially-reacted fuel and oxidizer streams. The exemplary combustor 125, further, boosts the inlet temperature of the thermal exhaust input 106 of the turbine 104 for maximum continuous power operation.

Those skilled in the art will appreciate that additional parameters may be varied and configuration changes made in order to enhance the control strategy. The variable parameters, for example, may include the cell pressure and the cell temperature of the SOFC 80. The configuration changes, for example, may include a series or parallel arrangement of multiple power generation modules 124, a series or parallel arrangement of sub-modules 80A,80B (see FIGS. 7A–7B) of the SOFC 80, a controllable pitch propeller (for a maritime vehicle), a power (electronic) conditioner, a mechanical transmission, a clutch, and the variable series resistor 120. A particular arrangement of the variable parameters, the configuration changes and the specific control strategy is dependent on the specific application.

FIG. 6 illustrates characteristic V-I profiles A,A',B,C,D, E,F. Profile A is representative of a standalone SOFC generator (e.g., the SOFC 8 of FIGS. 1–2). Profile A' is representative of a fuel cell V-I profile for a pressurized standalone SOFC generator (e.g., the SOFC 80 of FIGS. 4–5). The fuel cell V-I profile has a fuel cell current and a fuel cell voltage which generally decreases with increases in the fuel cell current. Profiles E,F are representative of two exemplary generator V-I profiles for a generator (e.g., the generator 100 of FIGS. 4–5). The profiles E,F have a generator current and a generator voltage which generally increases with increases in the generator current. The controller 40' of FIG. 4 uses the control line 116, which controls the boost voltage contribution of the series connected DC generator 100, in order to control the generator V-I profile, it being understood that the exemplary generator 100 may be operated as a generator in order to add a positive voltage to the fuel cell voltage or, alternatively, as a motor in order to add a negative voltage to (i.e., subtract a positive voltage from) the fuel cell voltage.

The power generation module 124 of FIG. 5 is configurable to various V-I profiles, including a zero slope (profile B) and a positive slope (profile C). The zero slope V-I profile B applies, for example, to ship service applications where a regulated, constant voltage is required. The positive slope V-I profile C applies, for example, to propulsion applications which require a positive slope. The exemplary profiles B,C may be produced, for example, by summing the profiles A'+E,A'+F, respectively, it being understood that many other combinations of a variety of these profiles (e.g., A+E, A+F, etc.), and intermediate or other profiles (not shown) are possible.

Continuing to refer FIG. 5, current flows from the SOFC 80 through the armature (not shown) of the generator 100. The magnetic excitation field of the generator 100 interacts with the current on the spinning armature to produce a boost voltage that adds to the voltage of the SOFC 80. The turbine 104 provides the torque which drives the generator 80. The resulting output voltage for the motor electric power input 88 is controllable throughout the load range of the turbine-generator 82. For example, if the turbine-generator 82 supplies power equivalent to 40% of the SOFC 80 power, then the turbine-generator 82 boosts the voltage of the SOFC 80 by 40% at a particular current level for the motor power input 88. Additional power control, for example, may be achieved by modulating the fuel input 90 and the oxidizer input 92 to the SOFC 80.

The DC unipolar electric propulsion motor 78 is a DC, low voltage device suitable for direct coupling to the power generation module 124. Direct coupled propulsion system control can be achieved, as discussed above with FIGS. 4 and 5, through control of the power generation module 124 in combination with control of the excitation magnetic field (B) of the unipolar motor 78. Those skilled in the art will appreciate that large changes in the load of the vehicle mechanical drive 86 may be handled by adding or subtracting additional power generation modules (not shown) in a manner similar to adding or subtracting diesel generator sets. This direct coupling of the power generation module 124 and the unipolar motor 78 minimizes the need for conventional power conversion components. This results in reduced system cost, weight, and power loss.

The exemplary unipolar motor 78 generally features the lowest weight and the lowest source noise of all motor types. The benefit to commercial (passenger) and military vessels is not only reduced noise but, also, the avoidance of noise reduction hardware, cost, and weight. Furthermore, the direct coupling control of the power generation module 124 applies not only to the exemplary SOFC 80 but, also, to other direct energy conversion types.

Figure 7A:
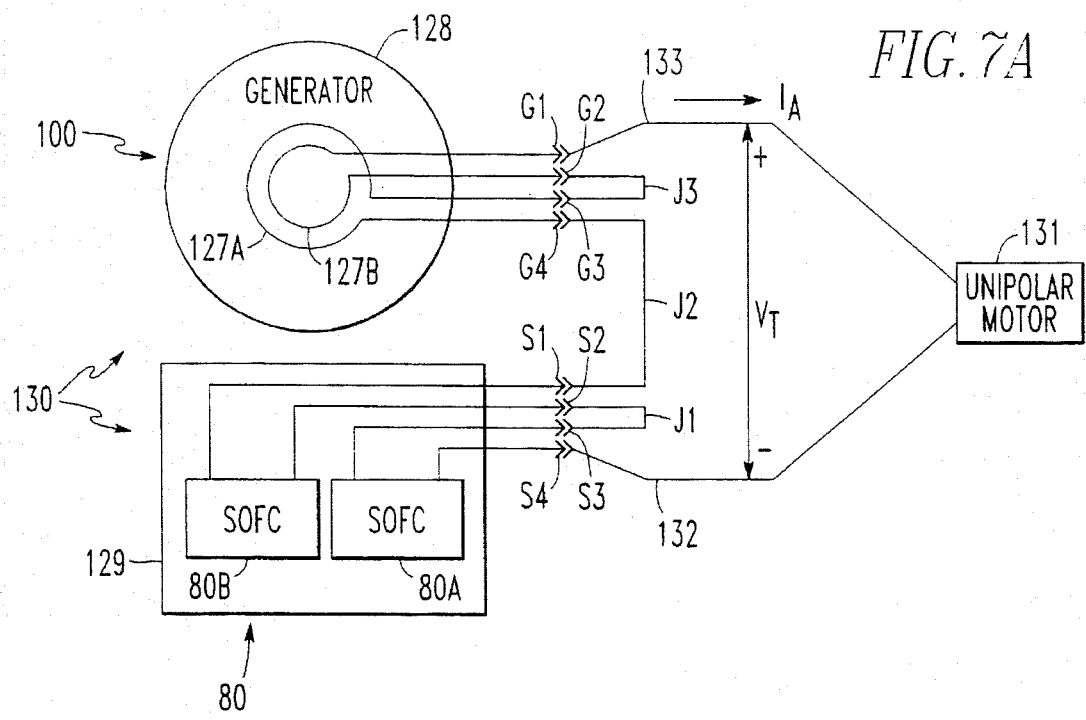
FIGS. 7A and 7B are schematic diagrams of a fuel cell and a generator in accordance with the invention.
Figure 7B:
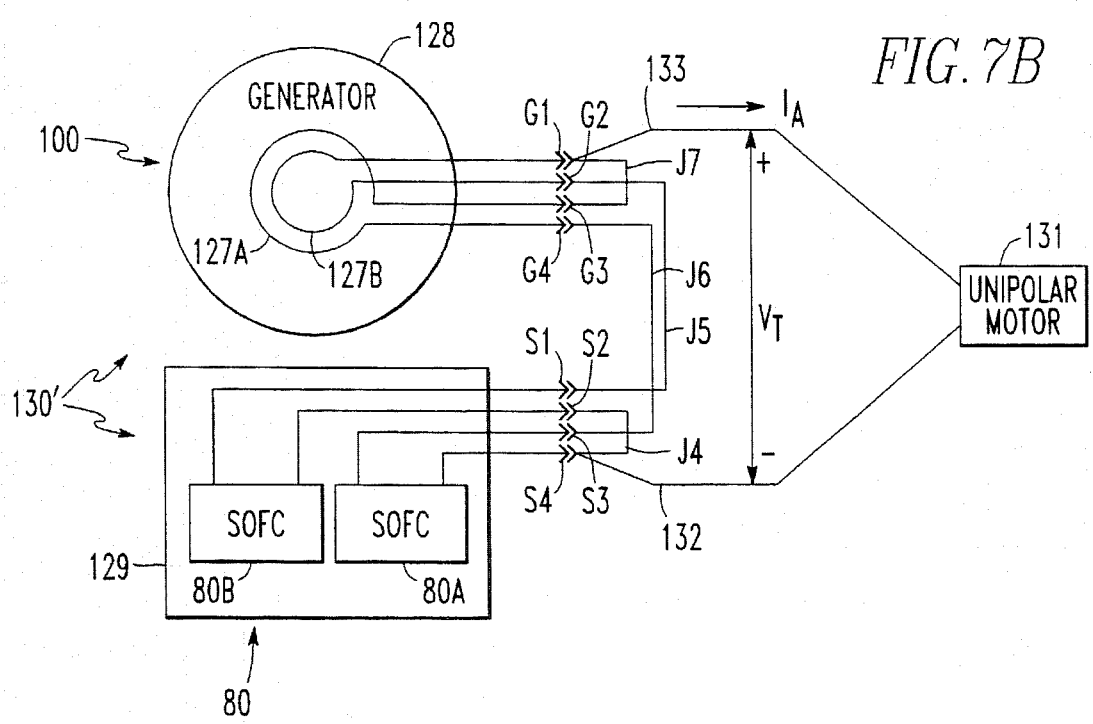

Referring to FIGS. 7A and 7B, two examples of reconfigurable hybrid power generation modules 130 and 130' are illustrated. These modules 130,130' are generally similar to the power generation module 124 of FIG. 5. The reconfiguration is accomplished by electrically rearranging the sub-modules 80A,80B of the SOFC 80 and, also, by electrically rearranging the individual armature turns 127A,127B of the boost DC unipolar electric generator 100. The generator 100 includes a housing 128 and a plurality of external terminals G1–G4. The terminals G1–G2,G3–G4 are connected to the armature turns 127B, 127A, respectively. The SOFC 80 includes a housing 129 and a plurality of external terminals S1–S4. The terminals S1–S2,S3–S4 are connected to the sub-modules 80B,80A, respectively. The SOFC 80 and the generator 100 provide a load current $I_A$ and a load voltage $V_T$ to a load, such as the exemplary unipolar motor 131, using two leads 132,133.

The exemplary configuration of FIG. 7A provides a relatively high voltage, low current profile (as shown in profile D of FIG. 6), which is typical of ship service distribution applications. Three jumpers J1,J2,J3 interconnect the terminals S3–S2,S1–G4,G3–G2, respectively. The current $I_A$ of the motor 131 flows through the sub-module 80A, the sub-module 80B, the armature turn 127A, and the armature turn 127B. The voltage $V_T$ of the motor 131, which is across the terminals S4–G1, is summed across the sub-module 80A, the sub-module 80B, the armature turn 127A, and the armature turn 127B. This configuration, hence, provides a series connection of the sub-module 80A, the sub-module 80B, the armature turn 127A, and the armature turn 127B.

The configuration of FIG. 7B, for example, provides a relatively low voltage, high current profile (as shown in profile C of FIG. 6), which is typical of the direct coupled unipolar propulsion applications as discussed above with FIGS. 4 and 5. Four jumpers J4,J5,J6,J7 interconnect the terminals S4–S2,S1–G2,S3–G4,G3–G1, respectively. This configuration provides a parallel connection of the motor 131, the series-connected sub-module 80A and the armature turn 127A, and the series-connected sub-module 80B and the armature turn 127B. Hence, each pair 80A–127A, 80B–127B directly provides power to the motor 131.

The exemplary jumpers J1–J7 may be changed in order to reconfigure the power generation modules 130,130' between a relatively high voltage, low current configuration (e.g., FIG. 7A for a ship service voltage of 750 VDC) and a relatively low voltage, high current configuration (e.g., FIG. 7B for a direct coupled propulsion motor voltage of 187.5 VDC). Furthermore, in FIG. 7B, because the exemplary unipolar generator 100 has a very low internal resistance, the internal resistance of the sub-modules 80A,80B minimizes circulating current which would, otherwise, flow through the parallel pairs 80A–127A,80B–127B and in other parallel (not shown) power generation modules 130 or 130'.

Figure 8:
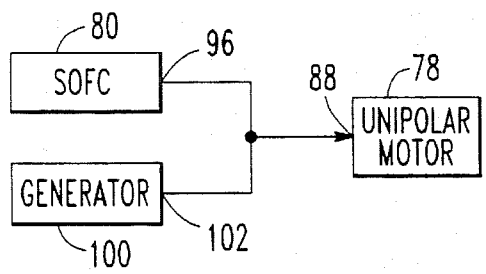
FIG. 8 is a schematic diagram of a fuel cell and a turbine-generator which form a power generator in accordance with another embodiment of the present invention.

FIG. 8 illustrates an alternative embodiment of the power train 74 of FIG. 4 and the power generation module 124 of FIG. 5. In this exemplary embodiment, the fuel cell power output 96 of the SOFC 80 and the generator power output 102 of the unipolar generator 100 are connected in parallel. In turn, this parallel connection supplies current to the motor power input 88 of the unipolar motor 78. Generator current from the generator output 102 supplements fuel cell current from the fuel cell output 96. This parallel connection, thus, adds the generator current to the fuel cell current in order to produce the DC motor current for the motor input 88.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of invention which is to be given the full breadth of the claims appended and any and all equivalents thereof.

What is claimed:

1. An apparatus for powering a load, said apparatus comprising:

fuel cell means having a plurality of sub-modules, each of the plurality of sub-modules for producing fuel cell electric power at a plurality of terminals;

generator means having a plurality of armature turns, each of the plurality of armature turns for producing generator electric power at a plurality of terminals; and a plurality of connection means for interconnecting the plurality of terminals of said fuel cell means with the plurality of terminals of said generator means in order to provide a configurable voltage-current profile for said load.

2. The apparatus as recited in claim 1 wherein said fuel cell means has a first housing and said generator means has a second housing, the plurality of terminals of said fuel cell means being located outside of the first housing, the plurality of terminals of said generator means being located outside of the second housing.

3. The apparatus as recited in claim 1 wherein each of the plurality of sub-modules and each of the plurality of armature turns produce a voltage; and wherein said plurality of connection means interconnect the plurality of terminals of said fuel cell means in series with the plurality of terminals of said generator means in order to sum the voltages for said load.

4. The apparatus as recited in claim 1 wherein the plurality of sub-modules is equal in number to the plurality of armature turns; and wherein each one of the plurality of sub-modules is connected in series with a corresponding one of the plurality of armature turns in order to directly provide power to said load.

5. An apparatus for powering a load, said apparatus comprising:

fuel cell means including a fuel input, an oxidizer input, a thermal exhaust output, and a plurality of sub-modules, each of the plurality of sub-modules for producing fuel cell electric power at a plurality of terminals;

turbine-generator means including generator means and turbine means for driving said generator means, said turbine means having a thermal exhaust input interconnected with the thermal exhaust output of said fuel cell means, said generator means having a plurality of armature turns, each of the plurality of armature turns for producing generator electric power at a plurality of terminals;

a plurality of connection means for interconnecting the plurality of terminals of said fuel cell means with the plurality of terminals of said generator means in order to provide a configurable voltage-current profile for said load; and control means for controlling at least one of the fuel input and the oxidizer input of said fuel cell means.

6. The apparatus as recited in claim 5 wherein said fuel cell means has a first housing and said generator means has a second housing, the plurality of terminals of said fuel cell means being located outside of the first housing, the plurality of terminals of said generator means being located outside of the second housing.

7. The apparatus as recited in claim 5 wherein each of the plurality of sub-modules and each of the plurality of armature turns produce a voltage; and wherein said plurality of connection means interconnect the plurality of terminals of said fuel cell means in series with the plurality of terminals of said generator means in order to sum the voltages for said load.

8. The apparatus as recited in claim 7 wherein each of the plurality of sub-modules has a fuel cell voltage-current profile; and wherein each of the plurality of armature turns has a generator voltage-current profile, the fuel cell voltage-current profile having a fuel cell current and a fuel cell voltage which generally decreases with increases in the fuel cell current, the generator voltage-current profile having a generator current and a generator voltage which generally increases with increases in the generator current.

9. The apparatus as recited in claim 8 wherein the plurality of sub-modules and the plurality of armature turns produce a series output voltage, and wherein the configurable voltage-current profile for said load has a load current and the series output voltage, the series output voltage being generally constant with respect to changes in the load current.

10. The apparatus as recited in claim 5 wherein the plurality of sub-modules is equal in number to the plurality of armature turns; and wherein each one of the plurality of sub-modules is connected in series with a corresponding one of the plurality of armature turns in order to directly provide power to said load.

11. The apparatus as recited in claim 10 wherein each of the plurality of sub-modules has a fuel cell voltage-current profile; and wherein each of the plurality of armature turns has a generator voltage-current profile, the fuel cell voltage-current profile having a fuel cell current and a fuel cell voltage which generally decreases with increases in the fuel cell current, the generator voltage-current profile having a generator current and a generator voltage which generally increases with increases in the generator current.

12. The apparatus as recited in claim 11 wherein each pair of the one of the plurality of sub-modules and the corresponding one of the plurality of armature turns produces an output voltage which directly provides power to said load, and wherein the configurable voltage-current profile for said load has a load current and the output voltage, the output voltage generally increasing with increases in the load current.

* * * * *